(12) United States Patent
Packard

(10) Patent No.: US 9,979,178 B2
(45) Date of Patent: May 22, 2018

(54) ARC FAULT CIRCUIT INTERRUPTER WITH SURGE SUPPRESSION

(71) Applicant: Pass & Seymour, Inc., Syracuse, NY (US)

(72) Inventor: Thomas N. Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days. days.

(21) Appl. No.: 14/844,609

(22) Filed: Sep. 3, 2015

(65) Prior Publication Data

US 2016/0072271 A1 Mar. 10, 2016

Related U.S. Application Data

(60) Provisional application No. 62/047,426, filed on Sep. 8, 2014.

(51) Int. Cl.
*H02H 3/00* (2006.01)
*H02H 1/00* (2006.01)
*H02H 9/04* (2006.01)
*H02H 3/33* (2006.01)

(52) U.S. Cl.
CPC .......... *H02H 1/0015* (2013.01); *H02H 9/041* (2013.01); *H02H 9/042* (2013.01); *H02H 3/338* (2013.01)

(58) Field of Classification Search
USPC ....................................... 361/42–50
See application file for complete search history.

(56) References Cited

U.S. PATENT DOCUMENTS

| | | | |
|---|---|---|---|
| 2009/0052120 A1* | 2/2009 | Weeks | H01R 13/641 361/601 |
| 2009/0180222 A1* | 7/2009 | Chen | H02H 9/042 361/45 |
| 2012/0147509 A1* | 6/2012 | Mechanic | H02H 9/041 361/49 |
| 2013/0135781 A1* | 5/2013 | Natili | H02H 3/20 361/91.2 |

* cited by examiner

*Primary Examiner* — Danny Nguyen
(74) *Attorney, Agent, or Firm* — Bond Schoeneck & King, PLLC; Frederick Price; George McGuire

(57) ABSTRACT

An AFCI protective system includes a MOV circuit that has a plurality of line terminals comprising at least one phase conductor, a neutral conductor or a ground conductor. A MOV is coupled to a pair of line terminals through a low impedance circuit, and a response circuit configured to activate a human readable indicator when the MOV is experiencing an end of life condition.

24 Claims, 11 Drawing Sheets

ARC FAULT CIRCUIT INTERRUPTER WITH SURGE SUPPRESSION

BACKGROUND OF THE INVENTION

1. Field of the Invention

The present invention relates generally to protective electrical wiring devices, and particularly to arc fault circuit interrupter devices.

2. Technical Background

An arc fault circuit interrupter (AFCI) is a protective device for protecting wiring from sputtering arcing conditions which, if allowed to persist could ignite nearby combustibles. Series arc faults occur in a single conductor in series with an electrical load. They may occur at a loose terminal screw or where a conductor has been severed but the ends are almost touching. The series arc current is no greater than the load current. Since the load current is limited by a 15 A or 20 A fuse or circuit breaker and since series arc faults involving loads less than 5 A are not considered hazardous, the range of load currents is 5 A to 30 A. On the other hand, parallel arc faults occur across the line, whether between the phase conductor to a neutral conductor, two phase conductors, or a phase to ground conductor. An over-driven staple or a nail driven through a cable are examples of how to get a parallel arc fault condition. Parallel arc fault current is limited by the voltage source impedance which depends on the length of conductors between the voltage source and the position of the fault in the branch circuit. Since the current is not limited by a load impedance, the range of currents is 75 A to 500 A.

AFCI's are typically located in a service panel where they are combined with a circuit breaker or in an outlet box where they are combined with a wiring device. Wiring devices comprise receptacles, ground fault circuit interrupters (GFCIs), transient voltage surge suppressors (TVSS's), surge protective devices (SPD's), protective devices, switches, occupancy sensors, nightlights, USB ports, low voltage portals, and various combinations thereof. For the wiring device-type AFCI, a portion of the branch circuit lies between the panel and the line terminals of the device referred to as the upstream circuit, and another between the load terminals of the device and the wiring connected to it and the loads that may terminate that wiring, referred to as the downstream circuit. The load terminals may include integral face receptacles and/or feed-through terminals. Wires connected to the feed-through load terminals daisy-chain to other receptacles to complete the branch circuit. Loads may be hard-wired to the AFCI or may have integral attachment plugs that receive power from the face receptacles or from downstream receptacles daisy-chained to the feed-through terminals. Loads may be connected to the receptacles using extension cords, power adapters, multiple outlet strips, or the like.

As implied by its name, an AFCI includes a circuit interrupter to interrupt the arc fault once detected. For wiring device AFCIs, it is possible to interrupt series arc faults in branch circuit wiring upstream of the AFCI and downstream of the AFCI as well as parallel arc faults downstream of the AFCI, but providing protection from parallel upstream arc faults has been a problem. Even if the AFCI could detect the upstream parallel arc fault condition and its circuit interrupter were to open as a result, the fault current would continue to flow.

In one approach that has been tried, the wiring device AFCI is required to be installed at the first outlet of the branch circuit. The downstream wiring to downstream receptacles would then be protected from parallel arc faults. Unfortunately the length of wire between the panel and the first outlet (sometimes referred to as the home run) remains unprotected from parallel arc faults. The problem is thus lessened but not eliminated.

In another approach, the length of the homerun has been limited to being a short distance, but this is burdensome to the installer and once again, the problem is not entirely eliminated.

In another approach, the conventional circuit breaker in the panel has been looked to as providing that missing protection. Although parallel arc fault currents in the homerun are greater than the 15 A or 20 A handle rating of the circuit breaker, the breaker does not always interrupt the current through the parallel arc fault quickly enough to prevent a fire.

What is needed is a wiring device AFCI that provides upstream parallel arc fault protection. What is needed is a wiring device that warns the user of the presence of an end-of-life condition when it is no longer capable of providing upstream parallel arc fault protection.

SUMMARY OF THE INVENTION

The present invention addresses the needs articulated above by providing a wiring device AFCI that provides upstream parallel arc fault protection. The present invention warns the user of the presence of an end-of-life condition when it is no longer capable of providing upstream parallel arc fault protection.

One aspect of the present invention is directed to an AFCI wiring device disposed in an electrical distribution system. The device includes a plurality of line terminals comprising at least one phase terminal, a neutral terminal, or a ground terminal and a plurality of load terminals comprising at least one phase terminal, a neutral terminal, or a ground terminal. A circuit interrupter is configured to electrically couple at least one of the line terminals to at least one of the load terminals in a reset state and decouple the at least one line terminal from the at least one load terminal in a tripped state. An AFCI circuit includes at least one arc fault sensor configured to sense an arcing condition in the electrical distribution system and provide corresponding output signals, and an arc fault detector configured to interpret the corresponding output signals and provide a trip signal when an arc fault is occurring to drive the circuit interrupter into the tripped state. At least one MOV is coupled to the plurality of line terminals or the plurality of load terminals through a low impedance circuit. A monitoring circuit is coupled across the MOV configured to detect a pre-determined voltage threshold, the monitoring circuit being configured to activate a human readable indicator or drive the circuit interrupter into the tripped state when the predetermined voltage threshold is exceeded.

In one embodiment, the at least one arc fault sensor includes at least one load current sensor.

In one version of the embodiment, the at least one load current sensor is selected from a group of sensors that includes a toroidal transformer, a shunt circuit, a magnetic sensor, or a Hall Effect device.

In one embodiment, the arc fault detector is configured to detect a line frequency component of a load current.

In one embodiment, the device includes a toroidal sensor.

In one version of the embodiment, the toroidal sensor is a differential transformer.

In one version of the embodiment, the device includes a second toroidal sensor, the second toroidal sensor being configured as a grounded neutral transformer.

In one version of the embodiment, the toroidal sensor is configured to detect an end-of-life or a near end-of-life condition in the at least one MOV.

In one embodiment, the device also includes an automonitoring circuit coupled to the AFCI circuit, the automonitoring circuit being configured to determine if the AFCI circuit is incapable of tripping the circuit interrupter.

In one version of the embodiment, the automonitoring circuit performs a two-step procedure when determining whether the AFCI circuit is operational.

In another aspect, the present invention is directed to an AFCI protective system that includes a MOV circuit having a plurality of line terminals comprising at least one phase conductor, a neutral conductor or a ground conductor. A MOV is coupled to a pair of line terminals through a low impedance circuit. A response circuit is configured to activate a human readable indicator when the MOV is experiencing an end of life condition.

In one embodiment, the response circuit includes a toroidal sensor.

In one version of the embodiment, the toroidal sensor is a differential transformer.

In one version of the embodiment, the toroidal sensor is configured to detect a leakage current in the MOV.

In yet another aspect, an AFCI device includes a plurality of line terminals comprising at least one phase terminal, a neutral terminal, or a ground terminal and a plurality of load terminals comprising at least one phase terminal, a neutral terminal, or a ground terminal. A circuit interrupter is configured to electrically couple at least one of the line terminals to at least one of the load terminals in a reset state and decouple the at least one line terminal from the at least one load terminal in a tripped state. An AFCI circuit includes at least one arc fault sensor configured to sense an arcing condition in the electrical distribution system and provide corresponding output signals, an arc fault detector configured to interpret the corresponding output signals and provide a trip signal when an arc fault is occurring to drive the circuit interrupter into the tripped state. A response circuit is configured to provide an activation signal when an end of life condition is detected. A monitoring circuit is coupled across a pair of line terminals and configured to monitor for a pre-determined voltage threshold in response to the activation signal, the monitoring circuit being configured to activate a human readable indicator or drive the circuit interrupter into the tripped state when the predetermined voltage threshold is exceeded.

In one embodiment, the device also includes a MOV coupled to the plurality of line terminals or the plurality of load terminals through a low impedance circuit, the response circuit being configured to activate a human readable indicator when the MOV is experiencing an end of life condition.

In one embodiment, the at least one arc fault sensor includes at least one load current sensor.

In one version of the embodiment, the at least one load current sensor is selected from a group of sensors that includes a toroidal transformer, a shunt circuit, a magnetic sensor, or a Hall Effect device.

In one embodiment, the arc fault detector is configured to detect a line frequency component of a load current.

In one embodiment, the device also includes an automonitoring circuit coupled to the AFCI circuit, the automonitoring circuit being configured to determine if the AFCI circuit is incapable of tripping the circuit interrupter.

In one version of the embodiment, the automonitoring circuit performs a two-step procedure when determining whether the AFCI circuit is operational.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
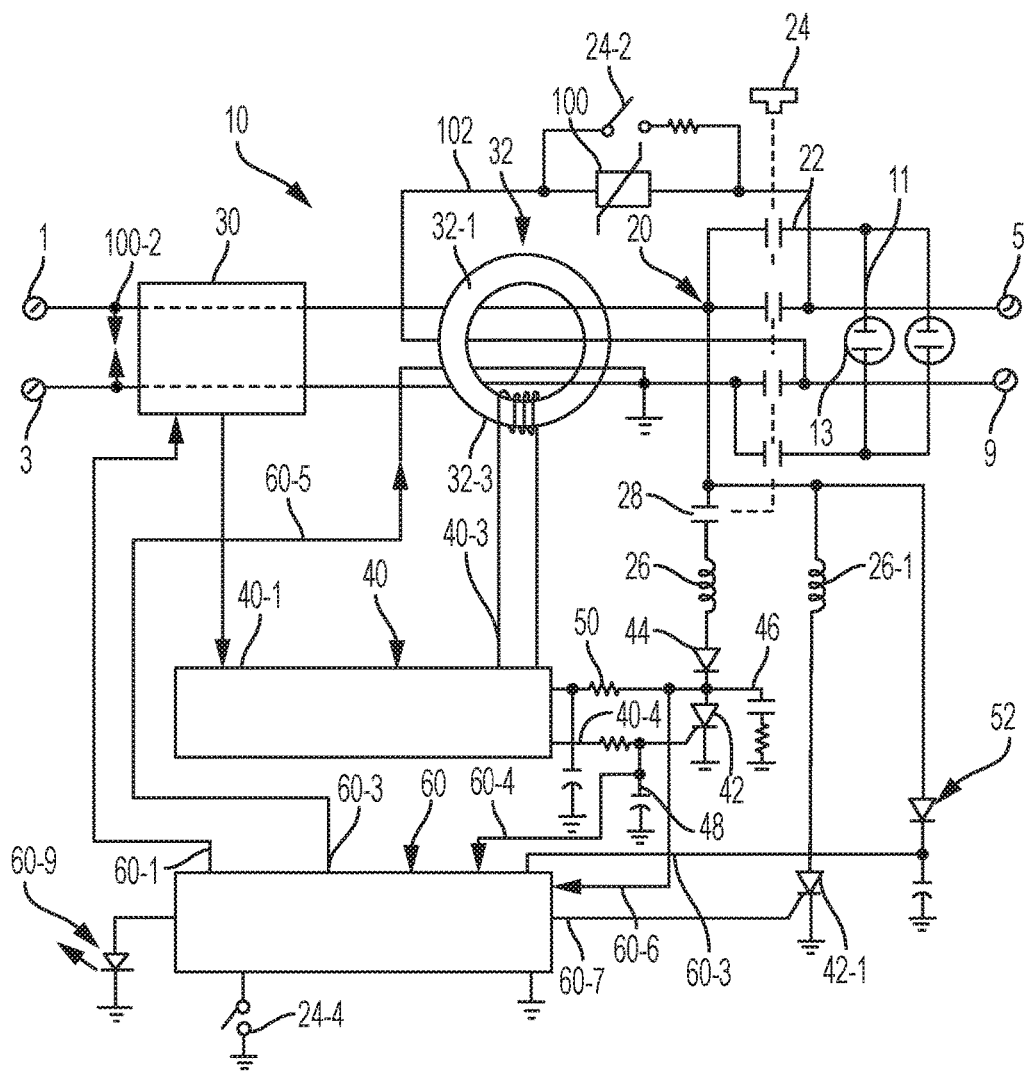
FIG. 1 is a block diagram of a first embodiment of the invention showing an AFCI receptacle with circuit power derived from the line side of the interrupter and with the MOV being connected in series with a set of power interrupting contacts of the circuit interrupter.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As embodied herein, and depicted in FIG. 1, a block diagram of an AFCI 10 in accordance with one embodiment of the present invention is disclosed. AFCI 10 includes line terminals 1, 3 for connection to a power source. When circuit interrupter 20 is placed in the reset state, accomplished by depressing reset button 24, the four sets of interrupting contacts 22 are closed and the power source is connected to the feed-through load terminals 5, 9 and receptacle load terminals 11, 13. When the circuit interrupter is in the tripped state, the interrupting contacts 22 are open and the line and load terminals get disconnected from one another. The internal conductors that carry current from the line to interrupting contacts 22 are referred to herein as line conductors 1, 3 and the internal conductors from the interrupting contacts to load terminals are referred to as load conductors 5, 9 or 11, 13.

Arc fault detector 40 detects an arc fault condition based on signals provided by sensor assembly 30. Sensor assembly 30 may include more than one sensor configured to sense at least one load current parameter and/or the line voltage. In an embodiment of the invention, at least one load current sensor is employed and detector 40 is configured to detect a line frequency component of the load current, and higher frequency components and patterns that are indicative of an arc fault. In another embodiment of the invention multiple load current sensors can be employed. Load current sensors are chosen from a family of sensor configurations that include toroidal transformers, shunts, magnetic sensors, or Hall Effect devices. Magnetic sensors and transformers include a core that consists of a set of rings in a stacked configuration, ferrite, powdered iron, permeable alloy, or air. When detector 40 detects the arcing condition from signals provided by sensor assembly 30, SCR 42 is triggered into conduction causing current to flow through solenoid 26 to trip interrupter 20. Once tripped, the circuit interrupter can be reset by manually depressing reset button 24.

Sensor assembly 30 allows detector 40 to identify parallel arc fault conditions in the downstream circuit or a series arc fault condition in the upstream or downstream circuits. Differential transformer 32 is a sensor specifically geared to sensing downstream arc fault currents from a downstream phase conductor to ground, whether to a downstream ground wire or a spurious ground such as a nearby water pipe. Line conductors 1,3 pass through transformer 32 counted here as two conductors. Ordinarily, device 10 just provides current to a load with no appreciable current to ground so the currents flowing on line conductors 1,3 are equal and opposite. Since the sum of those currents is at or near zero, there is little or no flux induced in core 32-1 and so transformer 32 provides little or no output signal on winding 32-3. However, when there is an arcing current to ground the arcing fault current flows on line conductor 1 and not on return conductor 3. Since the currents are no longer equal and opposite, there is a magnetic flux in core 32-1 and a signal in winding 32-3. If the fault current and thus the signal are great enough, detector 40 will trigger SCR 42 into conduction which in turn energizes solenoid 26 to trip interrupter 20.

Core 32-1 can consist of a magnetic material, mu-metal (e.g., a nickel-iron soft magnetic alloy), ferrite, powdered iron, permeable alloy, or plastic. The core may be formed as a solid piece, coiled, or laminated. Transformer 32 is configured to sense a particular frequency range in the arcing current somewhere between 60 Hz and 1 MHz.

Device 10 includes a metal oxide varistor (MOV) 100 configured to clamp surge voltages from lightning storms to about 500 Volts on the upstream circuit. MOV 100 is connected across feed-through load conductors 5, 9. In another embodiment of the invention (not shown), MOV 100 is connected across receptacle load conductors 11,13. Either way, an inter-connective path 102 forms a circuit between a pair of load conductors made up of wires, printed circuit board traces, or stamped metal parts.

Besides line conductors 1,3, inter-connective path 102 passes through toroidal transformer 32, counted as a third conductor. Ordinarily MOV 100 is non-conductive and so little or no current flows in path 102 and nothing happens. However when the MOV enters an end-of-life condition and starts becoming leaky, transformer 32 is capable of sensing that current and if it is sufficiently high, detector 40 triggers SCR 42 to trip the interrupter and stop the flow of current. (Considering the three conductors through transformer 32, the leakage current flows to the right on line conductor 1, to the right on inter-connective path 102, and to the left on line conductor 3 which nets out to the leakage current.) Each time reset is attempted, the leakage current resumes and detector 40 triggers SCR 42 to trip the interrupter again. This alerts the user that the AFCI needs to be replaced. If it were not for this tripping, the leakage current would persist and the current progressively climb until the MOV burns open. Once that happens, the MOV is no longer able to clamp surge voltages on the upstream circuit. Despite the upstream circuit being left unprotected from parallel arc faults, the user would not be alerted to replace the AFCI.

In another aspect of the invention, the leads of MOV 100 are connected to the load terminals of device 10 and neither is associated with a line conductor 1 or 3. This means that neither interrupting contact 22 is compromised by the MOV and that the arc fault current will stop flowing when the circuit interrupter enters the tripped state.

In order for MOV 100 to successfully clamp the voltage on the upstream circuit the electrical pathway that connects terminals 1,3 to the MOV has to be of low impedance since lightning surge currents can be in excess of 2,000 Amperes. Any voltage drops in that path would only add to the clamping voltage of the MOV resulting in higher voltages in the home run during the surge event. In one embodiment, the impedance of inter-connective path 102 including closed contacts 22 is less than 0.05 Ohms so the voltage drop is ordinarily no greater than 100 Volts. Also, since the closed contacts 22 are rated to carry a continuous current of at least 15 Amperes, they are capable of carrying this current without getting damaged or welding.

In another aspect of the invention, auto-monitoring circuit 60 recognizes an end-of life condition in the AFCI that prevents it from interrupting an arc fault. The end-of-life condition can happen in sensor assembly 30, toroidal transformer 32, detector 40, SCR 42 or solenoid 26. To test at least one sensor in assembly 30 and/or toroidal transformer 32 and detector 40, output 60-1 and output 60-3 of the auto-monitoring circuit impose test signals on a recurring basis automatically. The test signal from output 60-3 creates a current in wire loop 60-5 that passes through transformer 32, this passage constituting a fourth conductor through the transformer (like the third conductor, this one is not intended to carry load current). The test current around the wire loop simulates a parallel arc fault to ground and so if transformer 32 is operational it senses the test current and provides an output signal. Likewise if detector 40 is operational it detects the output signal. Of course, it is also desirable to test the operability of SCR 42 and solenoid 26 but not in a way that would cause the circuit interrupter to nuisance trip. In one approach the test signal is synchronized with the power line frequency so the signal at output 40-4 of the detector occurs during the negative half cycle. If operational, SCR 42 will turn ON until snubber 46 gets discharged by the SCR, the snubber having been charged during the preceding positive half cycle. The reason the interrupter does not trip is that diode 44 is reverse biased during the negative half cycle and so no current conducts through solenoid 26 to trip the interrupter. Should solenoid 26 or diode 44 have an open circuited end of life condition the snubber will not charge during the preceding positive half cycle. The SCR will not turn on due to there being no anode voltage. Likewise if the SCR has an open end of life condition there will be no turn-on. Input 60-6 of the end of life monitor checks the anode of the SCR for a high state to low state transition as evidence of turn-on. Failure to detect turn-on is evidence of an end of life condition in any of those components.

Another approach for checking solenoid 26 and SCR 42 for an end of life condition involves I/O terminal 60-4 of the end of life monitor circuit. According to this approach the AFCI is tested in two test steps. In the first step, I/O terminal 60-4 operates as an input and monitors the rising voltage in noise filter 48 that commences when detector 40 has detected the test signal. When the voltage rises to a predetermined level within a prescribed time interval, the first test step is successfully concluded: The sensor assembly 30 and/or transformer 32, and detector 40 are operational. This predetermined voltage level is less than the amount needed to drive SCR 42 into conduction (e.g. less than 0.6 Volts) and so there is no nuisance tripping. In the second step, I/O terminal 60-4 operates as an output to drive SCR 42 to turn ON either late in the positive half cycle where there is no longer sufficient energy from the power source to trip the circuit interrupter, or during the negative half cycle. Either way, nuisance tripping is avoided during the second test step. As with the first approach, input 60-6 of the end of life monitor checks the anode of the SCR for a high state to low state transition. This transition is evidence that SCR 42, diode 44, and solenoid 26 are operational. It should also be noted that noise filter 48 is shown using discrete components but it can also be realized as part of detector chip 40.

One issue that arises is that SCR 42 can have a shorted end of life condition. If it were not for auxiliary switch 28, solenoid 26 would be permanently connected to the line (by way of diode 44). Since solenoid 26 is designed to conduct current continuously for about 1 second, it would burn out in short order. Once that happens, the circuit interrupter would be inoperative and no longer capable of interrupting a fault condition. Auxiliary switch 28 is configured to be open when circuit interrupter 20 is in the tripped condition and to be closed when circuit interrupter 20 is in the reset condition. When SCR 42 shorts out at end of life, circuit interrupter 20 trips and the auxiliary switch removes power from solenoid 26 in typically 25 milliseconds. This prevents solenoid 26 from burning out. Furthermore each time reset is attempted, the circuit interrupter resets, the solenoid re-energizes, and about 25 milliseconds later the circuit interrupter trips again.

The power interrupting contacts 22 and the overall current-carrying path between the line terminals 1,3 and load terminals 5,9,11,13 are sized to carry 20 Amperes continuously as well as inrush currents of about 120 Amperes for 1 second. Also, these contacts are configured to close on 2,000 Amperes and then carry the current for about 25 milliseconds. In sharp contrast, auxiliary switch 28 (when closed) carries circuit current rather than the brunt of the load current. Most of the time circuit current is only about 0.01 Amperes and when solenoid 26 is occasionally energized to trip the interrupter it rises for about 0.01 seconds to only about 2 Amperes. The mechanism of the auxiliary switch is scaled back without risk of becoming damaged or welding. Whereas contacts 22 are typically 0.1 inches in diameter and each set closed with a make force greater than 175 grams, the auxiliary switch 28 closes with a make force of 35 to 50 grams and has contacts of 0.05 inches in diameter if any at all. Besides saving cost, an advantage of scaling back the auxiliary switch is that the roughly 125 grams of reduced make force can be allocated by trip mechanism 24 to contacts 22 to make their operation reliable. Reference is made to U.S. Pat. Nos. 6,958,895; 7,154,718; and 7,173,799, which are incorporated herein by reference as though fully set forth in its entirety, for a more detailed explanation of, among other things, an auxiliary switch.

Power supply 50 provides power from the line via solenoid 26, diode 44 and auxiliary switch 28 to AFCI detector 40. Of course, power supply 50 can experience an end of life condition. Since end of life monitor 60 has a separate power supply 52 and a separate power supply input 60-8 it is able to detect and respond to that condition as it does for others.

When an end of life failure condition is detected by end of life detector 60 one or more response can take place: An indicator 60-9 may provide audible and or visual indication. If the end of life failure involves sensors 30,32 or the AFCI detector 40, detector 60 may provide a signal via output 60-4 to SCR 42 to trip the interrupter. If the failure involves SCR 42, diode 44 or solenoid 26 such that the circuit interrupter is incapable of being tripped, detector 60 may provide a signal at output 60-7 to trip an alternate SCR 42-1 which trips the circuit interrupter via an alternate solenoid 26-1. If the failure involves sensors 30, 32 or detector 40, alternate SCR 42-1 and solenoid 26-1 may be used to trip the circuit interrupter. In order for indicator 60-9 to operate even after the circuit interrupter has tripped, solenoid 26-1 is not coupled to the line via auxiliary switch 28.

In another aspect of the invention, a manually operable test switch assembly 24-2 is disposed across MOV 100. Accordingly, the test circuit relies on path 102 and its passage through transformer 32 ("the third conductor") for conducting the test current which is at the line frequency. The test current is a simulated differential current that will trip the circuit interrupter if the device is not at end of life. Alternatively, a test switch 24-4 when depressed commands end of life detector 60 to generate a high frequency test signal on wire loop 60-5. Switch 24-2 or 24-4 may be operated by a separate button or by depressing reset button 24. In another aspect of the invention, spark gap 100-2 is connected across the line to protect MOV 100 from high energy lightning surges.

Figure 2:
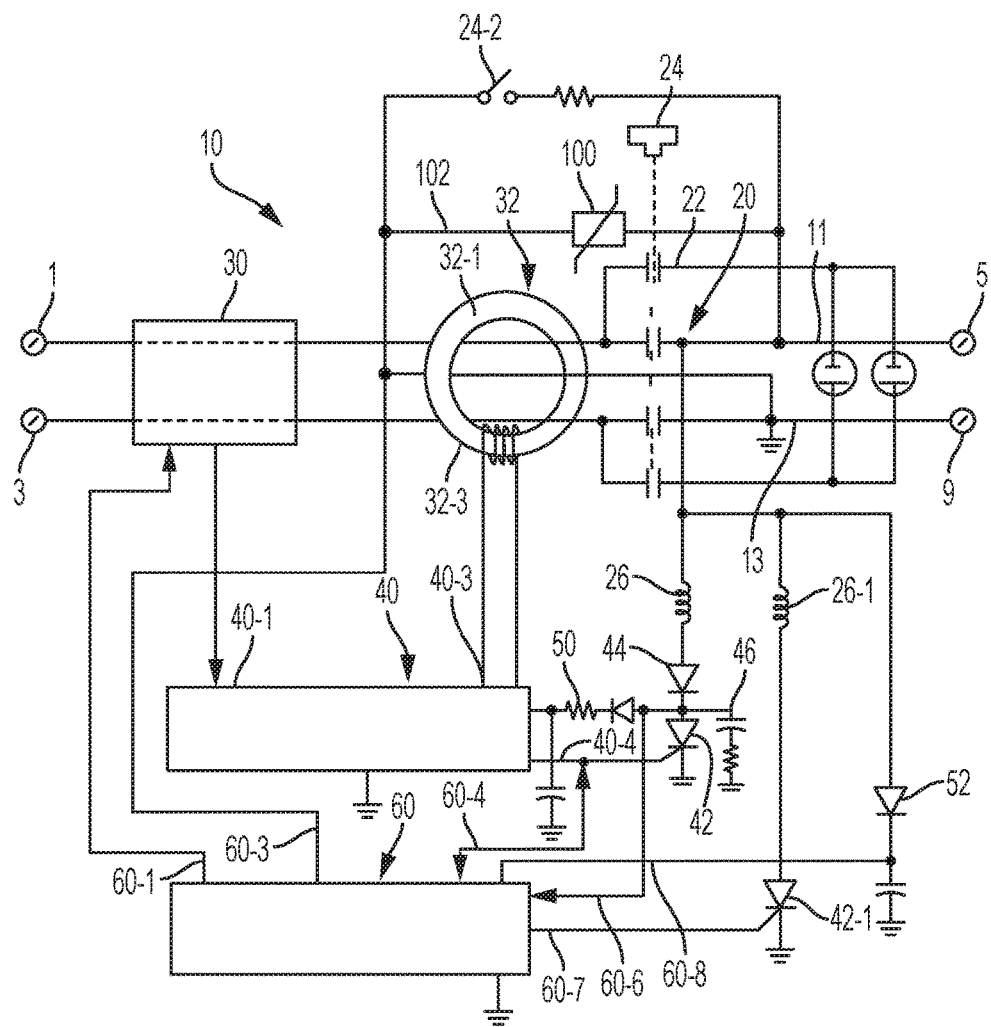
FIG. 2 is a block diagram of a second embodiment of the invention that is similar to FIG. 1 but with circuit power derived from the load side of the interrupter.

FIG. 2 is a block diagram of a second embodiment of the invention that is similar to the one in FIG. 1 except solenoids (26, 26-1) are connected to the load side of interrupting contacts 22. This means power for the AFCI circuit is derived from the load side of the circuit interrupter 20 instead of the line side. Path 102 is still connected across a set of load terminals (5,9) or (11,13), however this time a portion of path 102 (designated as path segment 102') and a portion of wire loop 60-5 are in common with each other. Whereas the embodiment shown in FIG. 1 has four conductors passing through transformer 32, this embodiment need only have three conductors. One advantage is that this allows the aperture of core 32-1 to be made smaller. Another is that the cross section of the conductor in path 102 can be made larger. Another is that that the auxiliary switch 28 of FIG. 1 is no longer needed: When SCR 42 shorts at end of life, current still flows through solenoid 26 but now the interrupting contacts 22 instead of auxiliary contacts break the current through the solenoid before it has enough time to burn out.

Figure 3:
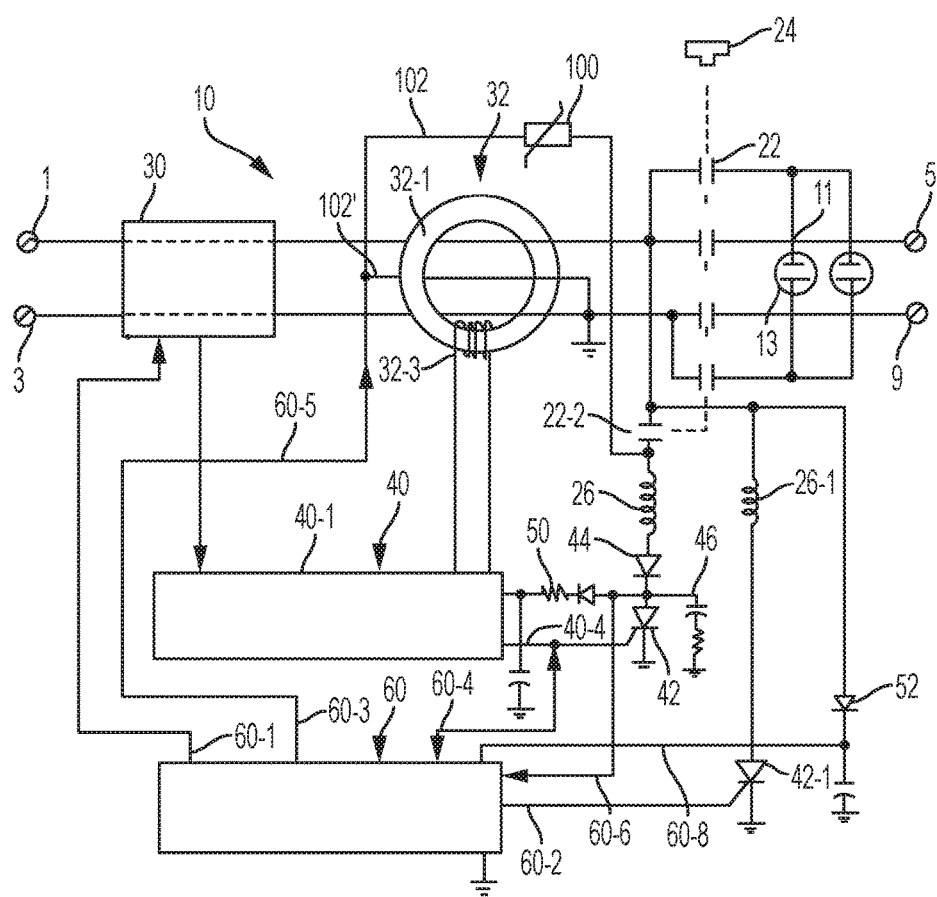
FIG. 3 is a block diagram of a third embodiment of the invention that is similar to FIG. 1 but with the MOV connected in series with an auxiliary switch.

FIG. 3 is a block diagram of a third embodiment of the invention that is similar to the one in FIG. 1 except MOV 100 is connected across line conductors 1,3 via a set of power interrupting contacts 22-2 disposed in the auxiliary switch position. In other words contact set 22-2 breaks the connectivity of MOV 100 to the line conductors when in the open position. Circuit interrupter 20 still trips when MOV 100 starts to become leaky at end of life to open contact set 22-2. Each time reset is attempted, contact set 22-2 breaks the leakage current through MOV 100 before the end of life condition progresses to a shorted condition or ultimately to an open condition. Also as with auxiliary switch 28 in other embodiments of the invention, contacts 22-2 provide power to the AFCI circuit and also serve to protect the solenoid when the SCR reaches end of life.

When the auxiliary switch is in the closed position, path 102 does not have any significant impedance in it so MOV 100 will be able to effectively clamp surge voltages in the home run. There must not be an electrical component in that path (e.g. solenoid 26) to limit the current through contact set 22-2 during a surge event. This means the auxiliary switch has to be capable of sustaining the full brunt of the surge current without either welding closed or open circuiting. By way of explanation, if contact set 22-2 were to weld closed and MOV 100 were to become leaky at end of life, SCR 42 would turn ON to attempt to trip the circuit interrupter but contact set 22-2 would only remain closed. In a matter of seconds solenoid 26 would burn up and this would allow the interrupter to be reset. Eventually MOV 100 would open circuit and leave the home run no longer protected from parallel arc faults without warning to the user.

Unlike auxiliary switch 28 in other embodiments of the invention, contacts 22-2 are not "scaled back" and actually constitute a fifth set of power interrupting contacts 22. The contacts are of comparable size and the make force is of comparable amount.

Figure 4:
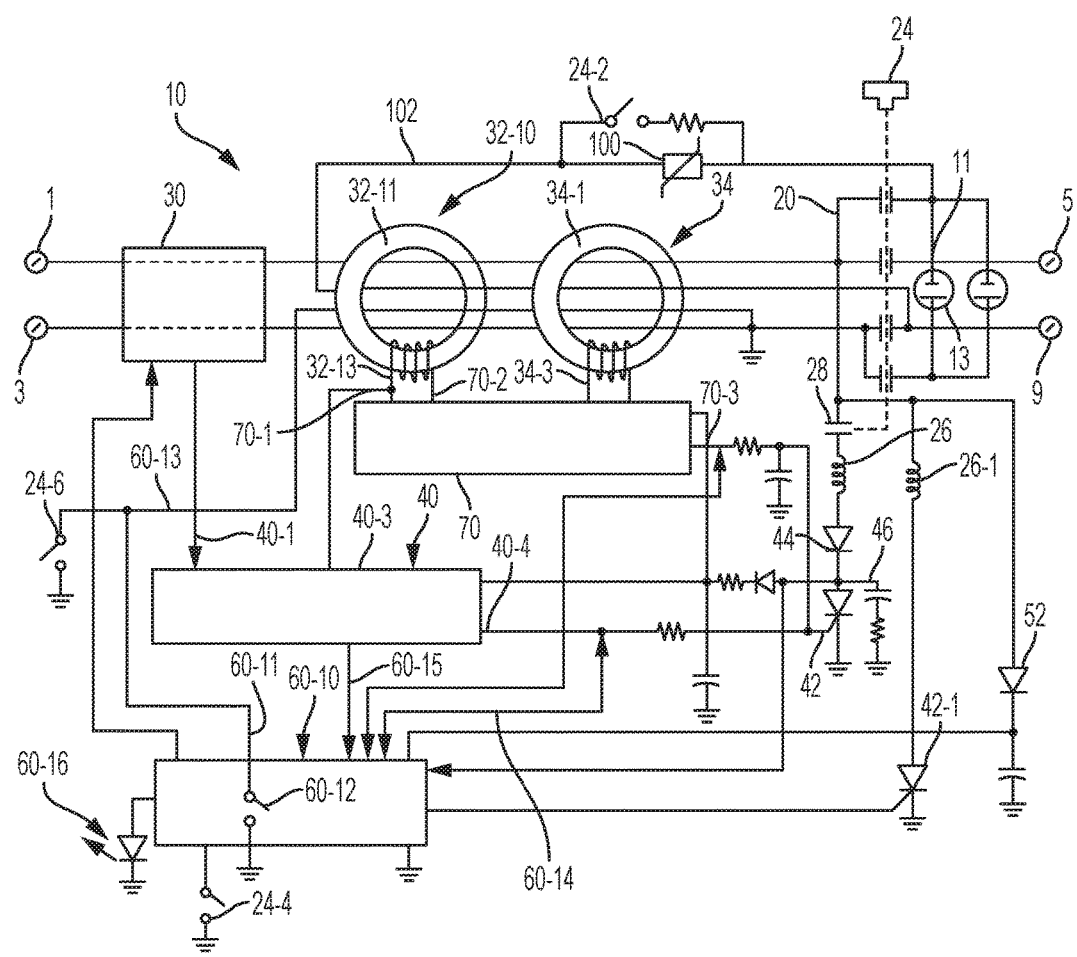
FIG. 4 is a block diagram of a fourth embodiment of the invention showing a combination AFCI-GFCI receptacle.

FIG. 4 is a block diagram of a fourth embodiment of the invention depicting a combination AFCI/GFCI receptacle. An additional transformer 34 may be included for grounded neutral detection, the transformer comprising a core 34-1 and winding 34-3. Whereas the differential transformer 32 in embodiments purely providing arc fault protection need only sense the high frequency components of the arc fault current, the one in the AFCI/GFCI device (transformer 32-10) must also be able to sense the currents associated with electric shock that are at the power line frequency (e.g. 60 Hz.) For that reason, core 32-11 is from a more limited (and expensive) list of materials that have a permeability of at least 3,000. Winding 32-13 may have more turns in it (e.g. 1,000 turns) in order that the transformer can be operated as a current transformer even at this lower frequency. For a more complete description of a current transformer in a GFCI, U.S. Pat. No. 4,024,436 is incorporated herein by way of reference in its entirety.

Differential transformer 32-10 provides signal to GFI detector 70 which is configured to detect signals within a range of frequencies between the power line frequency and about 5 kHz, a frequency used for grounded neutral detection. GFCI detector 70 is configured to provide an output signal to SCR 42 when there is a grounded neutral condition to be further described, a ground fault condition, or an arc fault to ground.

The GFCI includes differential transformer 32-10 (also used for arc fault detection) and may include a grounded neutral transmitter 34. The differential transformer 32-10 is coupled to the ground fault detector 70. The differential transformer L1 senses the current differential between the hot and neutral conductors 1,3 and provides the sensor signal to detector 70 via input terminals 70-1, 70-2. When the differential current exceeds a predetermined threshold value (i.e., a fault condition is present), an operational amplifier in the fault detector 70 will drive the detector output terminal pin 70-3 HIGH (if it is operating properly) and detect the fault condition. A HIGH output turns SCR 42 ON to energize the solenoid 26, and trip the circuit interrupter 20 including auxiliary switch 28. The solenoid 26 will remain energized for about 25 milliseconds or less. Once the fault condition is resolved, solenoid 26 is de-energized and the circuit interrupter may be reset using reset button 24.

A grounded neutral condition occurs when the load neutral conductor is accidentally grounded to create a parallel conductive path (relative to the neutral return path) between the neutral line terminal 3 and neutral load terminal 9. The grounded neutral transmitter 34 is configured to enable detection of this condition by generating a signal onto the neutral conductor 3 (but not the hot conductor) to create a differential current that, in turn, is sensed by the differential transformer 32-10. As before, the differential current will exceed the predetermined threshold causing the circuit interrupter to trip.

Conductive loop 102 passes through at least transformer 32-10 so MOV 100 at end of life creates a current differential condition to trip the circuit interrupter, but as is shown it may also pass through neutral transformer 34.

Device 10 includes monitoring circuit 60-10 for detecting an end of life condition in the AFCI and/or GFCI. As shown, monitoring circuit 60-10 tests the GFCI and its grounded neutral functionality. Conductive loop 60-13 passes through transformers 32-10. Grounded neutral simulation occurs whenever monitoring circuit 60-10 closes electronic switch 60-12 to complete the loop (when closed, output terminal 60-11 is substantially shorted to ground). Those skilled in the art will recognize that switch 60-12 can be a FET, MOSFET, or a bi-polar transistor. Conductive loop 60-13 is similar to the fourth conductor through the transformer described for other embodiments of the invention. However whereas the fourth conductor in other embodiments of the invention include a signal source that induces the loop current, this embodiment does not include one. Instead, the closure of switch 60-12 simply creates a short circuit.

Signal from transformer 32-10 may also be provided to input 40-3 of the arc fault detector for parallel arc fault detection. Whereas low frequency components in the current differential are stripped off by GFI detector 70 (e.g. 60 to 5 kHz) higher frequency components are stripped off by AFCI detector 40. The detectors have different time constants. Whereas a ground fault (grounded neutral fault) causes output 70-3 to go HIGH in about 10 milliseconds, an arc fault causes output 40-4 to go HIGH after two line cycles or about 50 milliseconds. Even though arc faults do not cause the circuit interrupter to respond as quickly, fire risk is still mitigated and at the same time nuisance tripping is avoided.

Particularly in a combination AFCI/GFCI device the reason why the device tripped is important to the user to make trouble shooting easier. Inputs 60-11, 60-14 of the monitoring circuit let it know whether tripping was due to an arc fault or a ground fault. Another input to the monitoring circuit from detector 70 (not shown) can let it know whether tripping was due to a line to ground fault or a neutral to ground fault (grounded neutral fault.) Input 60-15 of the monitoring circuit lets it know whether an arc fault was between the line conductors or from phase to ground, depending on whether the arcing signal came from sensor assembly 30 or transformer 32. The amount of load current sensed by sensor assembly 30 also lets the monitor know whether the fault was a series fault or a parallel fault. And of course monitoring circuit 60-10 recognizes whether it detected an end of life condition and whether the tripping was for that reason. These various fault conditions are then displayed differently on indicator 60-16 in a set of unique blinking patterns, audible indications, or colors.

Although detectors 40,70 and monitor 60-10 are shown as separate integrated circuits, it will be appreciated that these devices can be combined in one monolithic chip.

In an alternate embodiment (not shown) the combination AFCI/GFCI receptacle of FIG. 4 derives power from the load side of the circuit interrupter such as shown in other embodiments of the invention. As with FIG. 4, the third and fourth conductors through transformer 32-10 (and transformer 34) can become a shared conductor.

In a modular family of protective devices consisting of AFCI's, GFCI's, and combination AFCI/GFCI's, their respective differential transformers may have similar overall dimensions so as to be physically interchangeable to help standardize the tooling.

Manual test switches 24-2 and 24-4 have been previously described. Another manual test switch 24-6 is also shown. Whereas test switch 24-2 is connected across the line to simulate a differential current, test switch 24-6 is connected between the neutral line side and neutral load side of transformers 32-10, 34 so as to simulate a grounded neutral condition.

Figure 5:
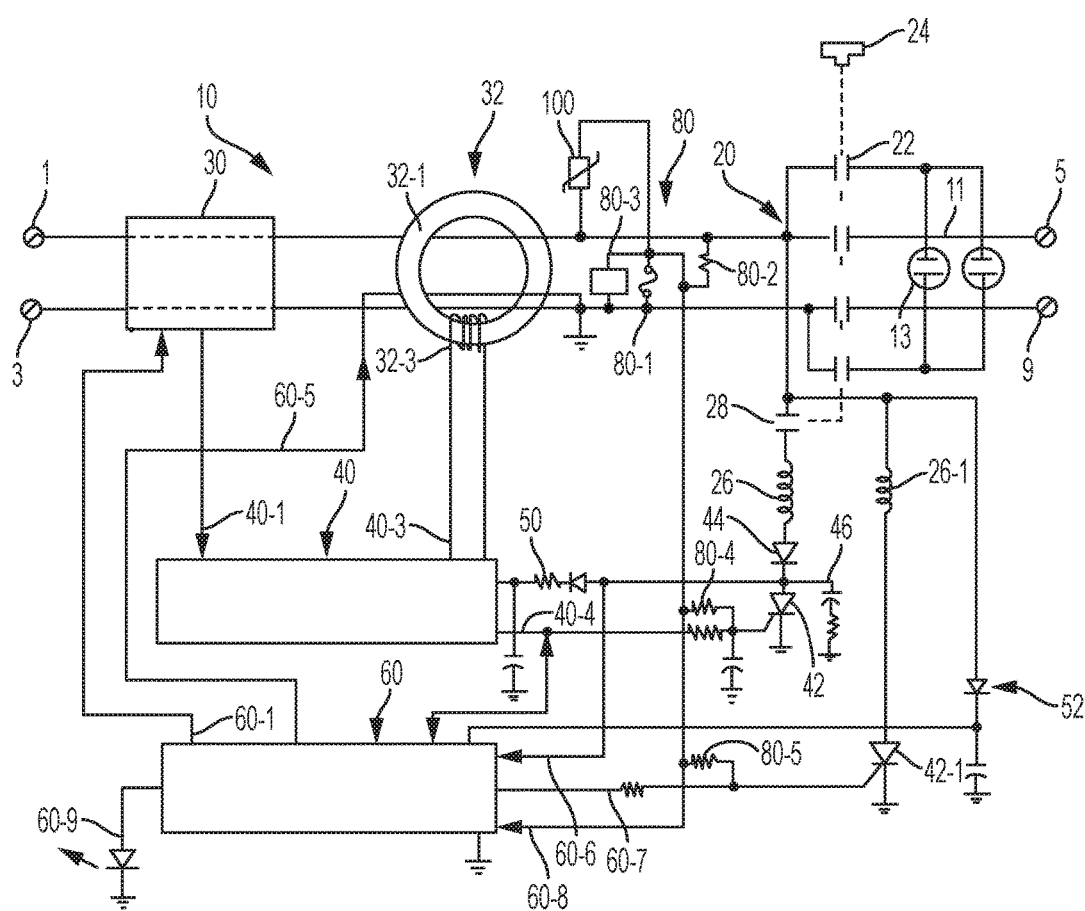
FIG. 5 is a block diagram of a fifth embodiment of the invention showing an AFCI receptacle with fuse-protected MOV.

FIG. 5 is a block diagram of a fifth embodiment of the invention depicting an AFCI receptacle. Unlike other embodiments of the invention, this one does not require a differential signal or even a differential transformer at all for identifying an end of life condition in MOV 100 (of course a differential transformer can be included anyway for some entirely different purpose such as for sensing arc faults to ground). Instead, it relies on a fuse assembly that responds to the end of life condition.

Fuse assembly 80 comprises a fuse 80-1, line impedance 80-2 (shown here as a resistor), indicator 80-3 and impedance (resistor) 80-4. Ordinarily fuse 80-1 is closed and MOV 100 is connected in series with the fuse across the line. When MOV 100 reaches end of life and shorts out, the current through MOV 100 is enough to blow fuse 80-1. When that happens, a portion of the current through impedance 80-2 diverts through indicator 80-3 turning it ON, and the rest flows through impedance 80-4 to turn SCR 42 ON to trip the circuit interrupter. Indicator 80-3 includes visual indication and/or audible indication. The visual indication can be steady or flashing and the audible indication can be made to be steady or beep. Thus for the fuse embodiment an end of life condition in a MOV is "indirectly detected": The MOV at end of life induces an end of life condition in another component (the fuse) which is what leads to the end of life response.

In an alternate embodiment, indicator 80-3 is omitted and when the fuse blows, signal at input 60-8 of the end of life detector goes HIGH. When that happens, end of life detector 60 drives an indicator 60-9 to turn ON. Indicator 60-9 will activate due to an end of life condition in the MOV and also to other end of life conditions in device 10 and need not distinguish the MOV failure from the other set of failures. In yet another embodiment, an end of life condition in MOV 100 causes an audible indicator 80-3 to turn ON whereas an end of life condition in device 10 causes a visual indicator 60-9 to turn ON. In yet another embodiment, a resistor 80-5 drives both SCR 42 and SCR 42-1 into conduction such that if either SCR is experiencing an end of life condition (or likewise their corresponding solenoids 26,26-1) the circuit interrupter 20 is assured of tripping. This further assures that circuit interrupter will trip when the MOV is experiencing an end of life condition irrespective of the operational condition of the AFCI circuit or the end of life detection circuit.

Figure 6:
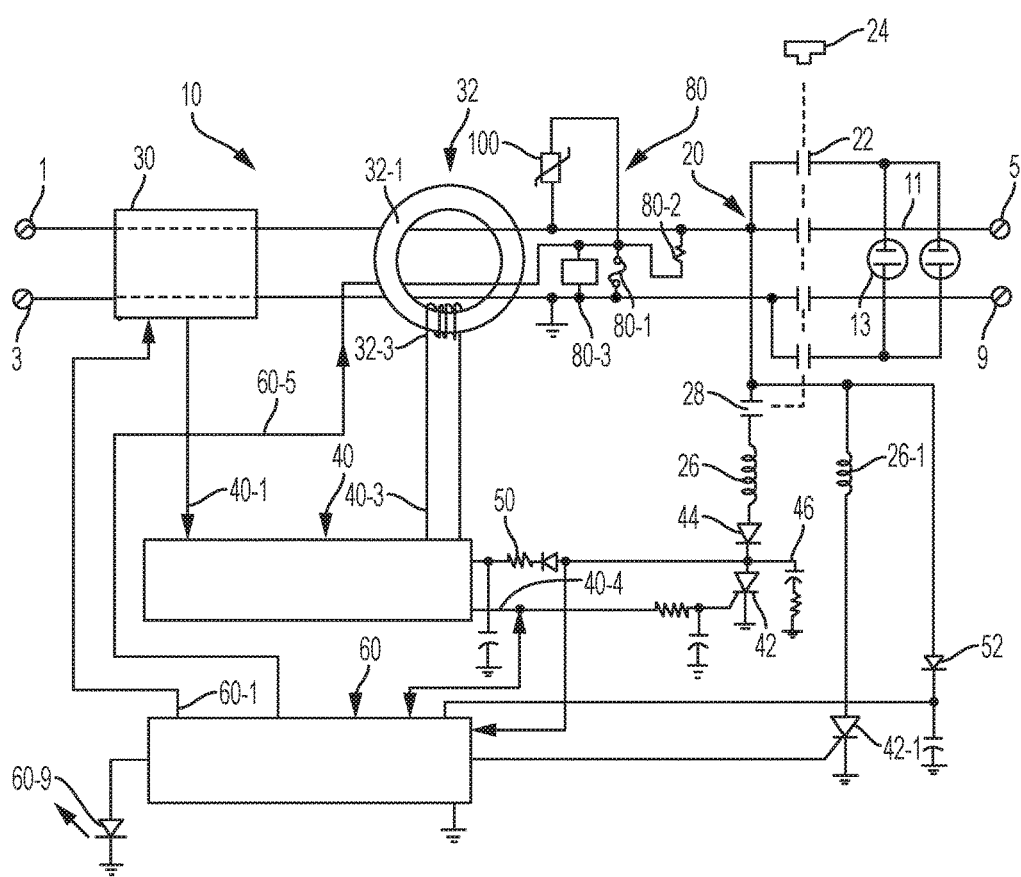
FIG. 6 is a block diagram of a sixth embodiment of the invention showing an AFCI receptacle that is similar to FIG. 5 but with fuse coupled to an end of life detection circuit.

FIG. 6 is a block diagram of a sixth embodiment of the invention depicting an AFCI receptacle that includes a fuse assembly 80. Here, fuse 80-1 is included in series with wire loop 60-5 and for the wire loop to be completed the fuse needs to be closed. When MOV 100 reaches end of life, fuse 80-1 opens and the wire loop is no longer completed, so transformer 32 no longer produces an output signal. Thus end of life detector 60 detects an end of life condition in the MOV as if there were an end of life condition in the AFCI circuit. Impedance 80-2 and indicator 80-3 may be omitted.

Figure 7:
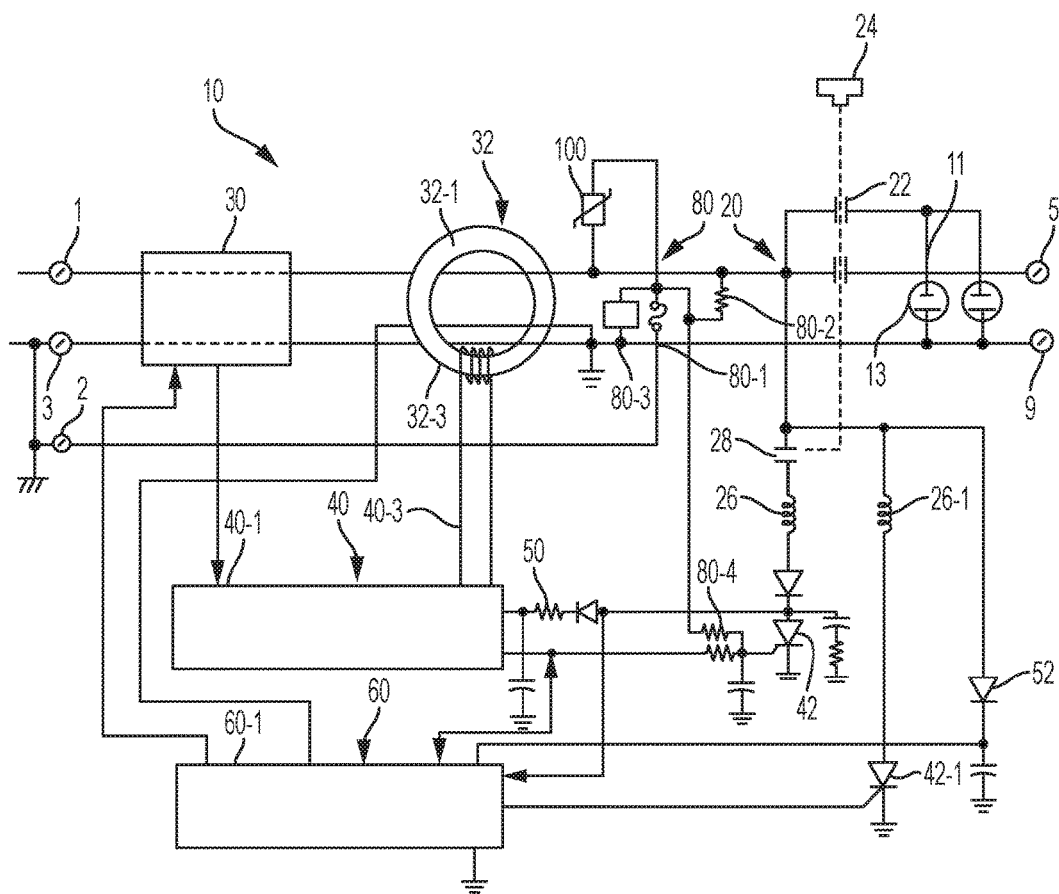
FIG. 7 is a block diagram of a seventh embodiment of the invention showing an AFCI receptacle that is similar to FIG. 5 but with the MOV connected to the ground conductor.

FIG. 7 is a block diagram of a seventh embodiment of the invention depicting an AFCI receptacle. This embodiment is similar to the one shown in FIG. 5 except fuse 80-1 is connected to the ground conductor 2. Ground terminal 2 and neutral terminal 3 are electrically connected together upstream of the device typically at a ground rod situated near the electrical panel. Normally the ground path between where MOV 100 is connected inside the device to the ground rod upstream of the device is electrically continuous. However, when there is a break somewhere in that path it is as though fuse 80 had blown and so the circuit interrupter trips in the manner previously described. However, in reality fuse 80 did not blow (the MOV had not reached end of life) and so if the ground discontinuity is in the wiring to the device and corrected, the device will then reset and operate normally.

Although a ground continuity feature has been shown here for a fuse embodiment, those skilled in the art will appreciate that the feature can be adapted to other embodiments of the invention. For example, in FIG. 1 where wire loop 60-5 is shown terminating on conductor 3, it would terminate instead on a ground conductor 2. A discontinuity in the ground path would behave as if the wire loop were open circuited, something that would be detected by end of life detector 60 as an end of life condition and then cause the circuit interrupter to trip.

Connecting the fuse to the ground terminal also results in reverse polarity miswire protection (reverse polarity miswiring is when the hot and the neutral conductors from the power source to the line terminals 1,3 have been transposed). When there is a reverse polarity condition, circuit interrupter 22 will trip, motivating the installer to correct the reverse polarity condition (this will be explained in greater detail later, see FIG. 9). Suffice it to say here that since the neutral conductor from the power source is assured of being connected to terminal 3, there is no longer a need to interrupt the path between terminal 3 and either of load terminals 9 or 13 meaning that two sets of interrupting contacts 22 may be eliminated. Circuit interruption in the hot circuit is enough to stop arcing faults.

Figure 8:
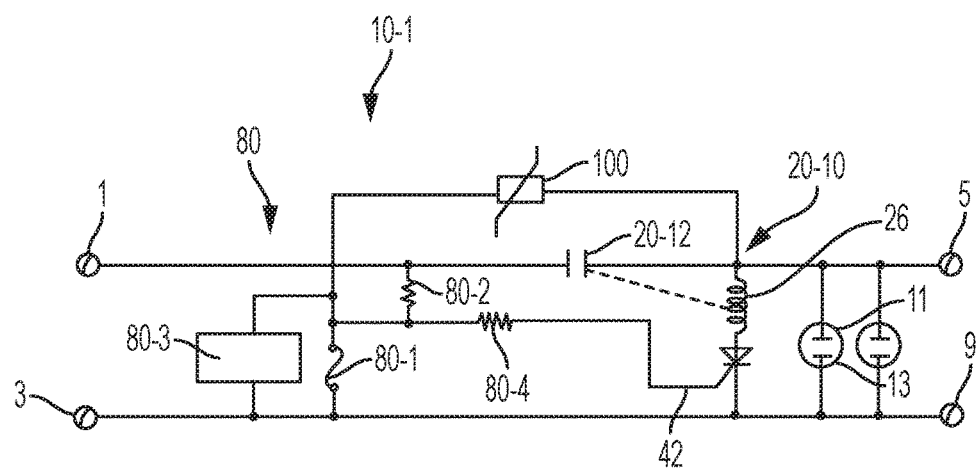
FIG. 8 is a block diagram of an eighth embodiment of the invention in which a MOV device protects an array of AFCI's distributed in an electrical distribution network as a system.

FIG. 8 is a block diagram of an eighth embodiment of the invention that is in actuality a system 10 comprising a MOV device 10-1 as shown here, and an array of AFCI's 10-2 in the electrical distribution system, one in each branch circuit to be arc fault protected. MOV device 10-1 is situated inside the service panel that installs like a circuit breaker, or situated in an outlet box near the panel. Since MOV device 10-1 includes a MOV 100 for suppressing lightning surge voltages otherwise on the branch circuits, it protects the home runs from parallel arc faults. AFCI's 10-2 do not necessarily include across-the-line MOVs.

MOV device 10-1 includes a MOV 100, of course, and a fuse circuit 80 but does not necessarily include an AFCI or GFCI. The fuse circuit operates as previously described. Circuit interrupter 20-10 is similar to interrupter 20 except that it has a single interrupting contact 20-12 to interrupt power to the entire load circuit, i.e. the face receptacle load terminals (11,13) and the feed-through load terminals (5,9). In other words, when the circuit interrupter trips, the receptacle load terminals and the feed-through load terminals do not get disconnected from one another. The reason that is okay for device 10-1 is that the MOV continues to afford protection even if the line conductors are miswired to the feed-through load terminals 5,9, another form of miswire sometimes referred to as "reverse line-load miswire." That is not the case for AFCI's or GFCI's. Referring back to FIG. 1 for illustration purposes, if line voltage gets miswired to terminals 5,9 and there is an arc fault to ground in a load plugged into face receptacle terminals 11,13, transformer 32 would not see that condition. And even if it did and circuit interrupter 20 tripped, power would continue to be supplied to the face. By disconnecting the feed-through load terminals from the receptacle load terminals when the circuit interrupter trips (explaining the extra contacts 22 in FIG. 1) and including an algorithm in end of life detector 60 that assures the interrupter will trip when miswired, unprotected power will not be provided to the face receptacles. Reference is made to U.S. patent application Ser. No. 13/834,636, which is incorporated herein by reference as though fully set forth in its entirety, for a more detailed explanation of reverse line-load miswire protection.

When MOV 100 reaches end of life the user is alerted to that fact by the indicator 80-3 being turned ON and furthermore by the denial of power to loads connected to the face receptacles or the feed-through load terminals. If MOV 100 is non-replaceable then there is no need to make the circuit interrupter resettable; it would only just trip again. In that instance the reset button may be omitted.

If the MOV fails and/or the fuse blows in 10-1, device 10-1 should be replaced with another device 10-1. Accordingly, a line voltage sensor may be included in each AFCI 10-2. If the voltage is greater than a predetermined amount, e.g., 500V, the AFCI concludes that the surge suppression device 10-1 is compromised and thus provide an indicator alarm that communicates the failure mode and the need to replace device 10-1.

In another embodiment of the invention (not shown) resistor 80-4 and circuit interrupter 20-10 is omitted and thus power is provided to the load terminals even when fuse 80-1 has opened in response to the MOV experiencing an end of life condition. The indicator 80-3 still reveals the problem (the blown fuse) even though power is now permanently provided to the load terminals. In another embodiment of the invention (not shown) resistor 80-4, circuit interrupter 20-10 and the face receptacle load terminals (11,13) and/or feed-through load terminals (5,9) are omitted. This device may be installed in a wall box located near the electrical panel in order to afford surge protection to all of the panel's branch circuits. As before, fuse 80-1 blows when MOV 100 is experiencing an end of life condition and the blown fuse is then revealed by indicator 80-3 turning ON.

Figure 9A:
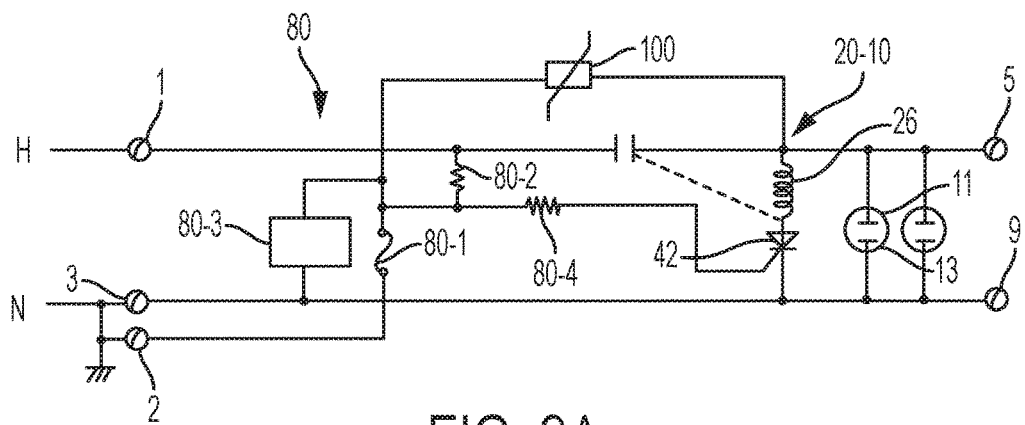
FIGS. 9A-9B is directed to a block diagram of a ninth embodiment of the invention that is similar to FIG. 8 except that the MOV is connected to the ground conductor.
Figure 9B:
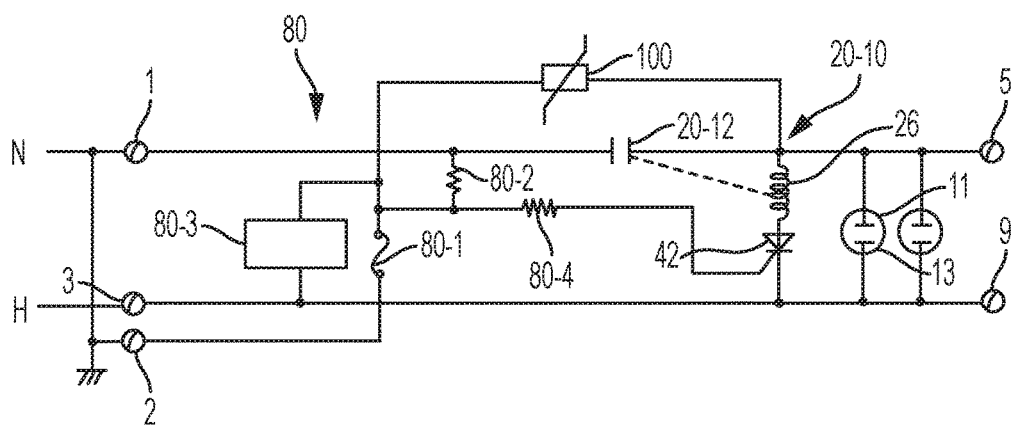

FIG. 9A,B is a block diagram of a ninth embodiment of the invention. This embodiment is similar to the one in FIG. 8 except that fuse 80-1 is terminated to the ground conductor 2 instead of the neutral conductor 3. As has been described, this assures that the ground path upstream of where MOV 100 connects to the path is continuous. It also assures that the installer will correct a reverse polarity miswire condition. In FIG. 9A device 10 is properly wired with the phase conductor being connected to terminal 1 and the neutral conductor to terminal 3. When fuse 80-1 is closed there is little or no voltage provided to the gate of SCR 42 and so the SCR does not turn on to trip the circuit interrupter. When device 10 is reverse wired as is illustrated in FIG. 9B there is now a voltage between terminals 2 and 3 that is conducted to the gate of SCR 42 by the impedance of the indicator circuit 80-3 and the SCR turns on to trip the interrupter. This motivates the installer to correct the wiring mistake. Of course circuit interrupter 20-10 includes a reset button 20-12 to reset the interrupter once the wiring error has been corrected.

Figure 10:
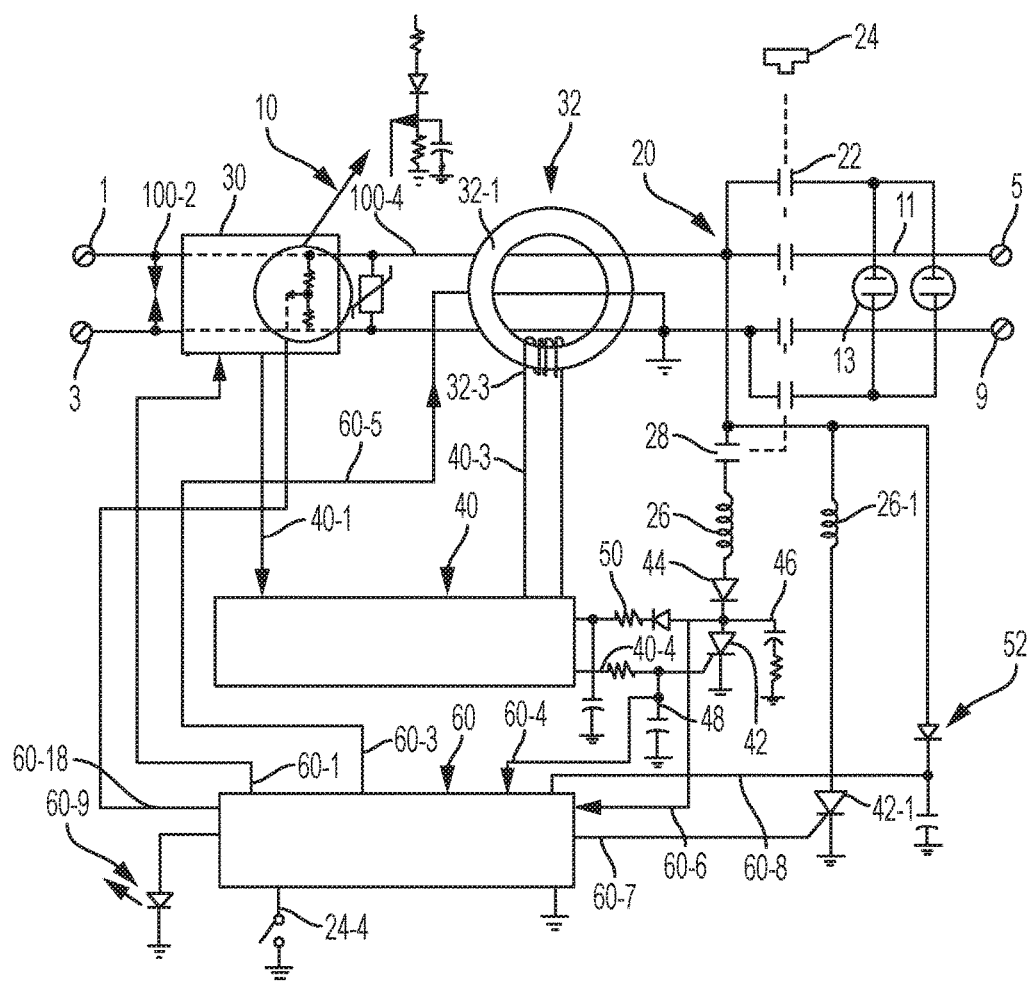
FIG. 10 is a block diagram of a tenth embodiment of the AFCI device that may be used in the system in FIG. 8.

FIG. 10 is a block diagram of a tenth embodiment of the invention depicting an AFCI receptacle. Here, AFCI 10 includes a MOV 100-4 directly connected across the line without a conductive loop being necessary. If a differential transformer is required, it is for arc detection or for some other purpose than proving that MOV 100-4 has reached end of life. As with other embodiments of the invention, it is important to know whether the MOV is at end of life and no longer affording upstream parallel arc fault protection. In those embodiments the determination was made before the MOV's failure progressed all the way to an open circuit. However, for this embodiment MOV failure will progress to an open circuit. The fact that has occurred gets recognized when surge voltages on the line greater than a predetermined magnitude start to occur. When a voltage greater than the predetermined threshold has been detected, the circuit interrupter in the device trips and/or its indicator needs to turn ON, alerting the user that the device needs to be replaced.

As has been described, sensor assembly 30 may include a line voltage sensor for sensing perturbations in the line voltage that can be arc indicative, providing signal to input(s) 60-1 of the monitor. Although that sensor can serve this purpose, a dedicated surge voltage sensor depicted as a voltage divider across the line provides signal to input 60-18 of monitor 60. Due to the brevity of a surge event typically less than 50 micro-seconds, the voltage divider may be replaced by a sample-and-hold circuit as shown in the inset to sustain the event for aiding detection. If monitor 60 detects a voltage greater than the predetermined magnitude, monitor 60 may change a state in volatile memory to keep providing a signal on output 60-4 or 60-7 to trip circuit interrupter 20 on a predetermined recurring basis. Alternatively, monitor 60 trips the circuit interrupter immediately each time the predetermined voltage is detected or it may include a built-in delay to trip the interrupter each time the predetermined voltage is detected but after the delay period. Alternatively, monitor 60 turns indicator 60-9 ON to indicate that there is an end of life condition.

An advantage of the embodiment is MOV 100-4 is connected across the line without any intervening electrical contacts 22 or 28. This means the contacts are not subject to the high lightning surge currents.

The embodiment in FIG. 8 depicts a protective system. When this embodiment is used in that system as AFCI 10-2, MOV 100-4 may be omitted and instead device 10-2 will rely on MOV 100 in device 10-1, or on others that might happen to be somewhere in the electrical distribution system. Not until all MOV protection of that home run is lost will surge voltages greater than the predetermined threshold start occurring. When that happens, the AFCI will trip. And when the user goes to panel and notices the indicator on device 10-1 is ON too, instructions will call for device 10-1 to be replaced first.

Figure 11:
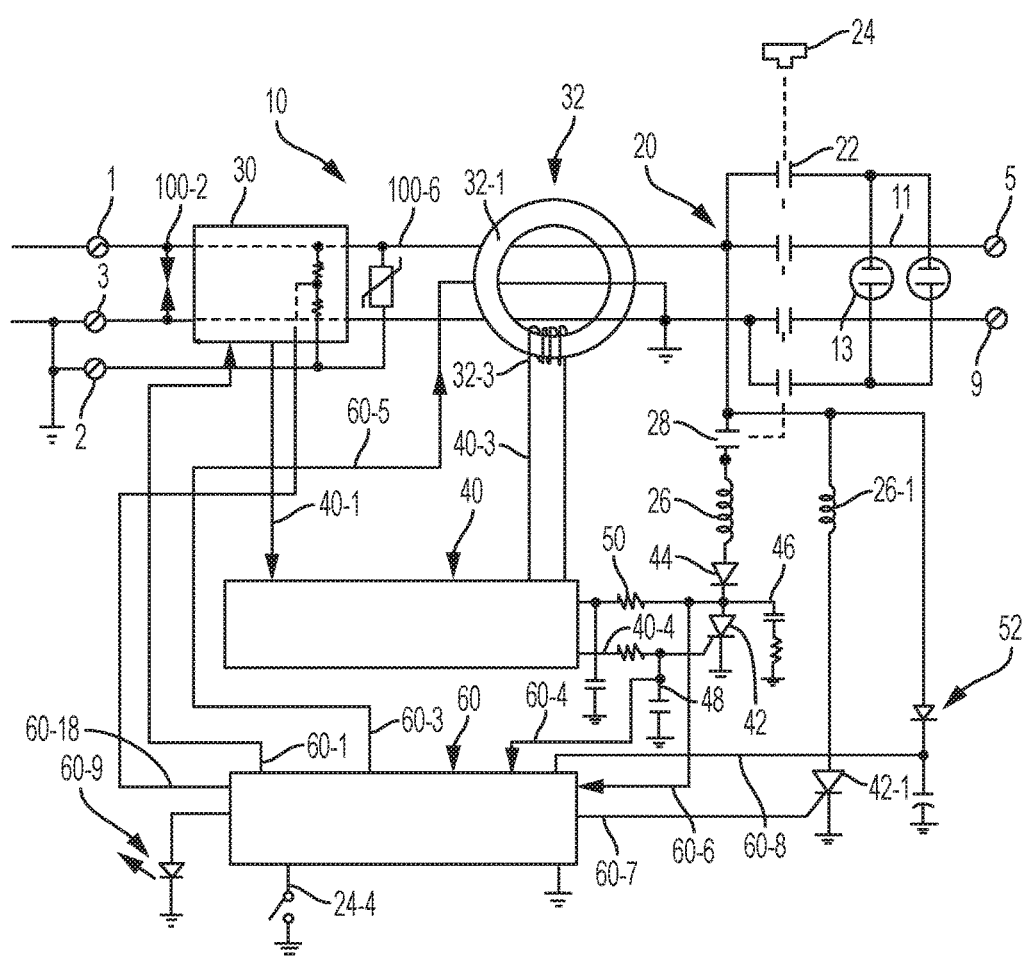
FIG. 11 is a block diagram of eleventh embodiment of the AFCI device that may be used in the system in FIG. 8.

FIG. 11 is a block diagram of an eleventh embodiment of the invention depicting an AFCI receptacle. This embodiment is similar to the one shown in FIG. 10 except MOV 100-6 (and the voltage divider) is connected to the ground conductor 2. The propensity for parallel arcing to the ground conductor is greater than to the neutral conductor due to the fact that it is typically disposed between those two conductors and is more lightly insulated or even bare. Thus it may be more effective to suppress surges to the ground conductor.

Unfortunately older houses do not have ground wires and for those instances nothing is connected to terminal 2. Unfortunately, MOV 100-6 is then in essence disconnected and so device 10 does not afford parallel upstream arc fault protection. To alleviate that problem, in an alternate embodiment (not shown) device 10 includes both MOV 100-4 and MOV 100-6. Whereas MOV 100-4 may provide the best overall protection for arc faults to ground, MOV 100-6 may provide the best overall protection for arc faults to another phase or to neutral at terminal 3 and in addition protect older housing stock that lacks the grounding conductor.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. There is no intention to limit the invention to the specific form or forms disclosed, but on the contrary, the intention is to cover all modifications, alternative constructions, and equivalents falling within the spirit and scope of the invention, as defined in the appended claims. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An AFCI wiring device disposed in an electrical distribution system, the device comprising:
   a plurality of line terminals comprising at least one phase terminal, a neutral terminal, or a ground terminal and a plurality of load terminals comprising at least one phase terminal, a neutral terminal, or a ground terminal;
   a circuit interrupter configured to electrically couple at least one of the line terminals to at least one of the load terminals in a reset state and decouple the at least one line terminal from the at least one load terminal in a tripped state;
   an AFCI circuit comprising at least one arc fault sensor configured to sense an arcing condition in the electrical distribution system and provide corresponding output signals, and an arc fault detector configured to interpret the corresponding output signals and provide a trip signal when an arc fault is occurring to drive the circuit interrupter into the tripped state;
   at least one MOV coupled to the plurality of line terminals or the plurality of load terminals, through a low impedance circuit such that the MOV substantially suppresses voltage surges across the plurality of line terminals;
   a monitoring circuit a portion of which is coupled across the MOV configured to detect a pre-determined voltage threshold, the monitoring circuit being configured to activate a human readable indicator or drive the circuit interrupter into the tripped state when the predetermined voltage threshold is exceeded.

2. The device of claim 1, wherein the at least one arc fault sensor includes at least one load current sensor.

3. The device of claim 2, wherein the at least one load current sensor is selected from a group of sensors that includes a toroidal transformer, a shunt circuit, a magnetic sensor, or a Hall Effect device.

4. The device of claim 1, wherein the arc fault detector is configured to detect a line frequency component of a load current.

5. The device of claim 1, further comprising a toroidal sensor.

6. The device of claim 5, wherein the toroidal sensor is a differential transformer.

7. The device of claim 5, further comprising a second toroidal sensor, the second toroidal sensor being configured as a grounded neutral transformer.

8. wherein the toroidal sensor is configured to detect an end-of-life or a near end-of-life condition in the at least one MOV.

9. The device of claim 1, further comprising an automonitoring circuit coupled to the AFCI circuit, the automonitoring circuit being configured to determine if the AFCI circuit is incapable of tripping the circuit interrupter.

10. The device of claim 9, wherein the automonitoring circuit performs a two-step procedure when determining whether the AFCI circuit is operational.

11. An AFCI protective system comprising:
    a plurality of line terminals comprising at least one phase terminal, a neutral terminal, or a ground terminal and a plurality of load terminals comprising at least one phase terminal, a neutral terminal, or a ground terminal;
    A circuit interrupter configured to electrically couple at least one of the line terminals to at least one of the load terminals in a reset state and decouple the at least one line terminal from the at least one load terminal in a tripped state;
    a MOV circuit including, a MOV coupled between a pair of the plurality of line terminals or between a pair of the plurality of load terminals, through a low impedance circuit; and
    a response circuit configured to trip the circuit interrupter when the MOV is experiencing an end of life condition, the MOV remaining coupled between the pair of the plurality of line terminals or between the pair of the plurality of load terminals in the tripped state.

12. The system of claim 11, wherein the response circuit includes a toroidal sensor.

13. The system of claim 12, wherein the toroidal sensor is a differential transformer.

14. The system of claim 12, wherein the toroidal sensor is configured to detect a leakage current in the MOV.

15. An AFCI device including:
    a plurality of line terminals comprising at least one phase terminal, a neutral terminal, or a ground terminal and a plurality of load terminals comprising at least one phase terminal, a neutral terminal, or a ground terminal,
    a circuit interrupter configured to electrically couple at least one of the line terminals to at least one of the load terminals in a reset state and decouple the at least one line terminal from the at least one load terminal in a tripped state,
    an AFCI circuit comprising at least one arc fault sensor configured to sense an arcing condition in the electrical distribution system and provide corresponding output signals, an arc fault detector configured to interpret the corresponding output signals and provide a trip signal when an arc fault is occurring to drive the circuit interrupter into the tripped state,
    a response circuit configured to provide an activation signal when an end of life condition is detected; and
    a monitoring circuit coupled across a pair of line terminals and configured to monitor for a pre-determined voltage threshold in response to the activation signal, the monitoring circuit being configured to activate a human readable indicator or drive the circuit interrupter into the tripped state when the predetermined voltage threshold is exceeded.

16. The device of claim 15, further comprising a MOV coupled to the plurality of line terminals or the plurality of load terminals through a low impedance circuit, the response circuit being configured to activate a human readable indicator when the MOV is experiencing an end of life condition.

17. The device of claim 15, wherein the at least one arc fault sensor includes at least one load current sensor.

18. The device of claim 17, wherein the at least one load current sensor is selected from a group of sensors that includes a toroidal transformer, a shunt circuit, a magnetic sensor, or a Hall Effect device.

19. The device of claim 15, wherein the arc fault detector is configured to detect a line frequency component of a load current.

20. The device of claim 15, further comprising an auto-monitoring circuit coupled to the AFCI circuit, the auto-monitoring circuit being configured to determine if the AFCI circuit is incapable of tripping the circuit interrupter.

21. The device of claim 20, wherein the automonitoring circuit performs a two-step procedure when determining whether the AFCI circuit is operational.

22. The device of claim 5, wherein the low-impedance circuit is routed through the toroidal sensor.

23. The device of claim 12, wherein the low-impedance circuit is routed through the toroidal sensor.

24. The device of claim 17, wherein the low-impedance circuit is routed through the toroidal transformer.

* * * * *

UNITED STATES PATENT AND TRADEMARK OFFICE
CERTIFICATE OF CORRECTION

PATENT NO. : 9,979,178 B2
APPLICATION NO. : 14/844609
DATED : May 22, 2018
INVENTOR(S) : Packard et al.

Page 1 of 1

It is certified that error appears in the above-identified patent and that said Letters Patent is hereby corrected as shown below:

In the Claims

Column 18, Line 1, in Claim 8 please insert --The device of claim 5-- between "8." and "wherein"
Column 18, Line 16, in Claim 11 please change "A" to "a"

Signed and Sealed this
Twenty-fifth Day of September, 2018

Andrei Iancu
*Director of the United States Patent and Trademark Office*